Patented Feb. 9, 1937

2,070,522

UNITED STATES PATENT OFFICE 2,070,522

PREPARATION OF MERCAPTO ARYL THIAZOLES

Albert M. Clifford, Stow, Ohio, assignor to Wingfoot Corporation, Wilmington, Del., a corporation of Delaware No Drawing. Application September 9, 1932
Serial No. 632,396

23 Claims. (Cl. 260—44)

This invention relates to a novel method of manufacturing mercapto aryl thiazoles.

Heretofore, various ways of synthesizing mercapto aryl thiazoles, more particularly mercaptobenzothiazole, have been known. Of these, the most successful has undoubtedly been the process disclosed in Kelly Patent 1,631,871, according to which mercapto aryl thiazoles are formed by simultaneously interacting carbon bisulfide, sulfur and a primary aromatic amine. Because of such factors as the purity of the product, the high degree of efficiency which is possible, and the available abundance of the required raw materials, the Kelly process has been and is preeminently successful among the recognized methods for the commercial manufacture of the mercapto aryl thiazoles.

However, with downward revision of prices of raw materials, various other processes, among them those hereinafter disclosed, will begin to approach the Kelly process in cheapness of operation. The processes of the present invention are in many respects comparable to the Kelly process, especially with regard to the degree of purity of the product. Coupled with the fact that the prices of the raw materials employed in these several processes have declined both with prices generally and with the discovery of improved processes of manufacture, this fact has made the processes of the present invention more or less feasible alternatives for the Kelly process.

Briefly stated, the processes of the present invention involve the manufacture of mercapto aryl thiazoles by reacting, as illustrated in the prepartion of mercaptobenzothiazole, either (a) formamid, aniline and sulfur or, if preferred, formamid, aniline, carbon bisulfide and sulfur, (b) formanilid and sulfur or formanilid, carbon bisulfide and sulfur, and (c) diphenyl formamidine, carbon bisulfide and sulfur or diphenyl formamidine and sulfur. These processes are closely related, as evidenced, for example, by the fact that formanilid is ordinarily formed by the interaction of formamid and aniline, formanilid being a phenyl formamid. It will be understood that these are but examples of the use of compounds of this type in the synthesis of the mercapto aryl thiazoles.

These processes in general involve the reacting of sulfur or sulfur and carbon bisulfide with such compounds as formanilid, whether previously formed or created in situ, and diphenyl formamidine. In general, the method consists in autoclaving the formanilid or diphenyl formamidine in the presence of sulfur or sulfur and carbon bisulfide. The reactions involved take place within the optimum temperature range of 200 to 275 degrees C., at which temperatures the pressure falls within the limits of 15–60 atmospheres.

It is, of course, to be understood that the formanilid hereinabove referred to as one of the reacting ingredients may be prepared in situ by introducing aniline into a mixture of formamid and sulfur. The effect of combining these ingredients is first to form formanilid. The latter material reacts with sulfur or sulfur and carbon bisulfide to yield the ammonium salt of mercaptobenzothiazole, which decomposes into ammonia and mercaptobenzothiazole. Thus it is feasible to employ prepared formanilid or, in the alternative, to react sulfur, formamid and aniline to yield formanilid in situ, the only difference being that in one case the reaction yields mercaptobenzothiazole directly, whereas in the other, as pointed out above, there is formed the ammonium salt of mercaptobenzothiazole.

Employing diphenyl formamidine, the reaction takes place according to the following equation:

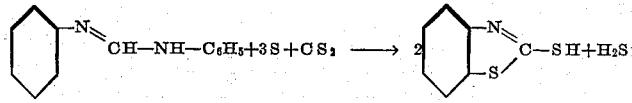

It will be observed that 1 mol of diphenyl formamidine, 1 mol of carbon bisulfide and 3 atoms of sulfur react in this equation to give two molecules of mercaptobenzothiazole. The proportions may, however, be varied over a considerable range.

Where preformed formanilid is employed, carbon bisulfide is advantageously used in a 10 to 20 percent excess, although in either case the molar quantities may be used. Substitution of a part of the sulfur in this reaction by carbon bisulfide is not necessary, but often desirable. Thus autoclaving a mixture comprising 118 grams of formanilid, 32 grams sulfur and 91 grams of carbon bisulfide for three hours at a temperature of 230 to 245 degrees C. under a pressure of 200 to 575 pounds per square inch was found to yield 124 grams, or 76 percent based on 1 mol of formanilid, of mercaptobenzothiazole of high purity.

Under similar conditions, the synthesis of mercaptobenzothiazole from diphenyl formamidine may be accomplished. Thus the diphenyl formamidine may be autoclaved for approximately three hours at 225 to 250 degrees C., the pressures being approximately the same as in the experiment heretofore described. Using one half of the theoretical amount of sulfur, a 56 percent yield of mercaptobenzothiazole was obtained. The product, as is also true with the product obtained by the formanilid process, may be treated with dilute sodium hydroxide until such portion dissolves as its soluble in alkali, thereafter separating the alkaline solution from the insoluble tarry matter, and, by adding dilute acid to the solution, precipitating the mercaptobenzothiazole.

Obviously, it is not necessary that formanilid and diphenyl formamidine be employed. In place of formanilid it is possible to employ the corresponding ortho, meta and para tolyl compounds, as well as such related compounds as the various xylyl, naphthyl and anthracyl derivatives. In any event, however, the ortho carbon atom should be unsubstituted, having a single hydrogen attached thereto. In the case of formamidine, it is obviously not necessary to employ diphenyl formamidine, but instead such varied compounds as phenyl tolyl formamidine, di-tolyl formamidine, phenyl naphthyl formamidine, dinaphthyl formamidine, monophenyl, formamidine, monotolyl formamidine, monoxylyl formamidine, mononaphthyl formamidine, etc. The range of products obtained therefrom is correspondingly wide.

It is not necessary in the practice of the invention herein described to follow the directions herein given in respect of the proportions employed, the materials reacted, the temperatures specified and the pressures recommended: they may readily be varied within wide limits. Similarly, various changes may be made in other aspects of the invention without departing from the spirit of the invention or from the scope of the appended claims, wherein it is intended to set forth all patentable novelty inherent in the invention.

What I claim is:

1. In the manufacture of mercaptobenzothiazole, the step of interacting formanilid with sulfur.

2. In the manufacture of mercaptobenzothiazole, the step of interacting with sulfur the reaction product of formamid and aniline.

3. In the manufacture of mercaptobenzothiazole, the steps of interacting formamid and aniline to form formanilid and treating with sulfur the formanilid so formed.

4. In the manufacture of mercaptobenzothiazole, the steps of interacting formamid and aniline to form formanilid and treating the reaction product formed therefrom with sulfur and carbon bisulfide.

5. In the manufacture of mercaptobenzothiazole, the step of interacting phenyl formamid with sulfur and carbon bisulfide.

6. In the manufacture of the mercaptobenzothiazoles, the step of interacting a phenyl formamidine having a replaceable hydrogen on an orthocarbon atom, sulfur and carbon bisulfide.

7. In the manufacture of the mercapto aryl thiazoles, the step of interacting with sulfur the reaction product of a formamid and a primary aromatic amine of the benzene series having a replaceable hydrogen on an orthocarbon atom.

8. Process of preparing the ammonium salt of mercaptobenzothiazole which comprises reacting formamide, sulfur and aniline.

9. In the manufacture of a mercaptobenzothiazole, the step of interacting sulfur and a compound of the formula

where R is a phenyl radical having a replaceable hydrogen on an orthocarbon atom, said materials being reacted in the proportion of a small excess more than two gram-atomic weights of sulfur and one mol. of said compound.

10. A process of preparing mercaptobenzothiazole which comprises reacting formanilid with sulfur in the approximate proportions of one mol. of formanild and two gram-atomic weights of sulfur.

11. A process of preparing mercaptobenzothiazole which comprises reacting under pressure and at a temperature of 200–275° C. formanilid and sulfur in the approximate proportions of one mol. of formanilid and a small excess more than two gram-atomic weights of sulfur.

12. A process of preparing a mercapto aryl thiazole which comprises reacting under pressure and at a temperature of 200–275° C. sulfur and an aryl carbocyclic formamide having a replaceable hydrogen on an orthocarbon atom.

13. A process of preparing a mercapto aryl thiazole which comprises reacting under pressure and at a temperature of 200–275° C. sulfur, carbon bisulfide and an aryl carbocyclic formamide having a replaceable hydrogen on an orthocarbon atom.

14. A process of preparing a mercapto aryl thiazole which comprises reacting under pressure and at a temperature of 200–275° C. sulfur and an aryl formamide of the benzene, naphthalene and anthracene series having a replaceable hydrogen on an orthocarbon atom in the approximate proportion of two gram-atomic weights of sulfur and one mol. of said formamide.

15. A process of preparing the ammonium salt of a marcapto aryl thiazole which comprises reacting formamide, sulfur and a primary aryl carbocyclic amine having a replaceable hydrogen on an orthocarbon atom.

16. A process of preparing the ammonium salt of a mercapto phenylene thiazole which comprises reacting formamide with sulfur and an alkyl substituted aniline having a replaceable hydrogen on an orthocarbon atom.

17. A process of preparing the ammonium salt of a mercapto aryl thiazole which comprises reacting formamide, sulfur and a primary aryl carbocyclic amine having a replaceable hydrogen on an orthocarbon atom under pressure at a temperature of 200–275° C.

18. A process of preparing mercaptobenzothiazole which comprises reacting diphenyl formamidine with sulfur.

19. A process of preparing mercaptobenzothiazole which comprises reacting under pressure and at a temperature of 200–275° C. diphenyl formamidine, sulfur and carbon bisulfide in the approximate proportions of one mol. of diphenyl formamidine, three gram-atomic weights of sulfur and one mol. of carbon bisulfide.

20. A process of preparing mercatobenzothiazole which comprises reacting under pressure and at a temperature of 200–275° C. sulfur and a phenyl formamidine having a replaceable hydrogen on an orthocarbon atom.

21. A process of preparing a mercapto aryl thiazole which comprises reacting sulfur and a compound of the formula

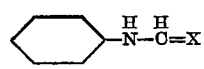

wherein X is a bivalent substituent selected from the group consisting of oxygen and the imino radicals.

22. A process of preparing mercapto aryl thiazoles which comprises reacting under super-atmospheric conditions of temperature and pressure sulfur and a compound of the formula $$R-\underset{H}{N}-\underset{H}{C}=X$$

wherein R is an aromatic carbocyclic radical having a replaceable hydrogen on an orthocarbon atom and X is a bivalent substituent selected from the group consisting of oxygen and the imino radicals, said sulfur being employed in a small excess more than that required for the reaction.

23. A process of preparing mercapto aryl thiazoles which comprises reacting under pressure and at a temperature of 200–275° C. sulfur, carbon bisulfide and a di(aryl carbocyclic) formamidine, said aryl carbocyclic radicals each having a replaceable hydrogen on an orthocarbon atom, said materials being reacted in the approximate proportions of three gram-atomic weights of sulfur, one mol. of the bisulfide and one mol. of the formamidine.

ALBERT M. CLIFFORD.